United States Patent [19]
Histed et al.

[11] 3,765,990
[45] Oct. 16, 1973

[54] APPARATUS FOR SIDE SEALING TWO LAYERS OF HEAT SEALABLE FILM TO COMPLETE A PACKAGE

[75] Inventors: William N. Histed, Hamilton, Ontario; Harry Shaw, Aurora, Ontario, both of Canada

[73] Assignee: Gerrard Company, Ltd., Hamilton, Ontario, Canada

[22] Filed: Aug. 12, 1971

[21] Appl. No.: 171,122

[52] U.S. Cl. .................... 156/515, 53/372, 156/582, 156/251
[51] Int. Cl... B32b 31/18, B32b 31/20, B65b 51/16
[58] Field of Search.................... 156/515, 582, 251; 93/DIG. 1; 53/372, 373

[56] References Cited
UNITED STATES PATENTS

| 2,117,452 | 5/1938 | Robinson et al. | 156/251 X |
| 2,987,107 | 6/1961 | Sylvester et al. | 156/515 X |
| 2,987,106 | 6/1961 | Sylvester et al. | 53/372 X |
| 3,109,764 | 11/1963 | Natelli | 156/582 |
| 2,117,452 | 5/1938 | Robinson et al. | 156/515 |

*Primary Examiner*—Philip Dier
*Attorney*—Douglas S. Johnson

[57] ABSTRACT

Apparatus for side sealing packages made of plastic films consists of a rotary member having a heated sealing and cutting blade to the side of which is another blade, heated by the first blade, the two blades forming a pair of seals; the blades bear against a moving belt which also supports the package and a pair of upper belts are provided one to each side of the rotary member, these belts working in conjunction on the upper side of the seal to remove any tension thereon during and immediately after sealing.

3 Claims, 2 Drawing Figures

Patented Oct. 16, 1973

3,765,990

INVENTOR.
WILLIAM N. HISTED
HARRY SHAW

BY

Attorney

APPARATUS FOR SIDE SEALING TWO LAYERS OF HEAT SEALABLE FILM TO COMPLETE A PACKAGE

1. Field of Invention

This invention relates to heat sealing machines and has particular reference to the type of machine which seals the opposed sides of plastic bags after the ends of the bags have been previously formed also by heat sealing.

2. Prior Art

Canadian Pat. No. 843,913 describes a heat sealing apparatus to form the ends of plastic bags which apparatus consists of a supporting means adapted to support upper and lower heat sealable films at a sealing position with the upper film lying on top of the lower film, and heat sealing means above the supporting means at the sealing position. The heat sealing means consists of a pivotably mounted sealing blade that is rotatable about an axis, means for completely rotating the sealing blade about such axis, and means for heating the sealing blade to a heat sealing temperature. The heat sealing blade is positioned such that during a portion of a rotation it is adapted to lie across and firmly contact the upper heat sealable film. The temperature of the heat sealing blade and the pressure between it and the supporting means is sufficient to heat seal the upper and lower films together.

The apparatus as described above will only seal and cut the end of the package; it is desirable in many cases to form a seal along a line which serves at the same time to define the edge of the sealed bag which seal is usually referred to as an edge seal. Since the package is moving linearly, a rotary sealing member is usually employed to define and cut the edge of the package.

It is an object of the invention to provide an improved apparatus which employs rotary sealing to form the edge seal while the bags are moving at a relatively high speed along a conveyor after the end seals have been formed.

In the past, edge seals have been formed by subjecting the walls of opposed plastic films to a heat squeeze along a comparatively thin line thus making it possible either simultaneously or immediately afterwards to sever and remove the excess material lying beyond the seal line. Because of the narrow nature of this line, an undesirable strain is placed upon it when the seal is formed in close proximity to the bag contents. It has been found that this strain is better accommodated if the edge seal is formed in two substantially parallel lines, one of which is called a "bead seal" and the other a "fin seal".

However, a problem in effecting this type of seal is to maintain the films for a sufficient period of time in their same position after the seals are formed to enable proper cooling to take place; this avoids any strain on the films during this period.

SUMMARY OF THE INVENTION

The invention is based on the discovery that a satisfactory side seal can be effected if the two layers of film being sealed together are held between moving belts of a specific arrangement. A broad belt is provided for the underside, thus also supporting the package, and forming the backing for the seal blade. A pair of upper belts are also provided one to each side of the sealing blade, these belts working in conjunction to remove any tension from the plastic films during and immediately after sealing. To obtain the best advantage of this arrangement, the sealing blade is constructed of a first circular heated blade which is rotatable at a speed which causes the periphery to be movable at the same linear speed as the belts. A second heated sealing disc is located to the side of the abovementioned sealing and cutting blade nearest the package, but this second heat sealing disc is heated simply by heat transfer from the first blade. The first circular heating blade providing heat forms a bead seal, also acting to cut the material, and the other disc which operates at a lower temperature forms the fin seal.

BRIEF DESCRIPTION OF THE DRAWINGS

The invention will now be described in relation to the accompanying drawings, in which.

DESCRIPTION OF THE PREFERRED EMBODIMENT

Figure 1:
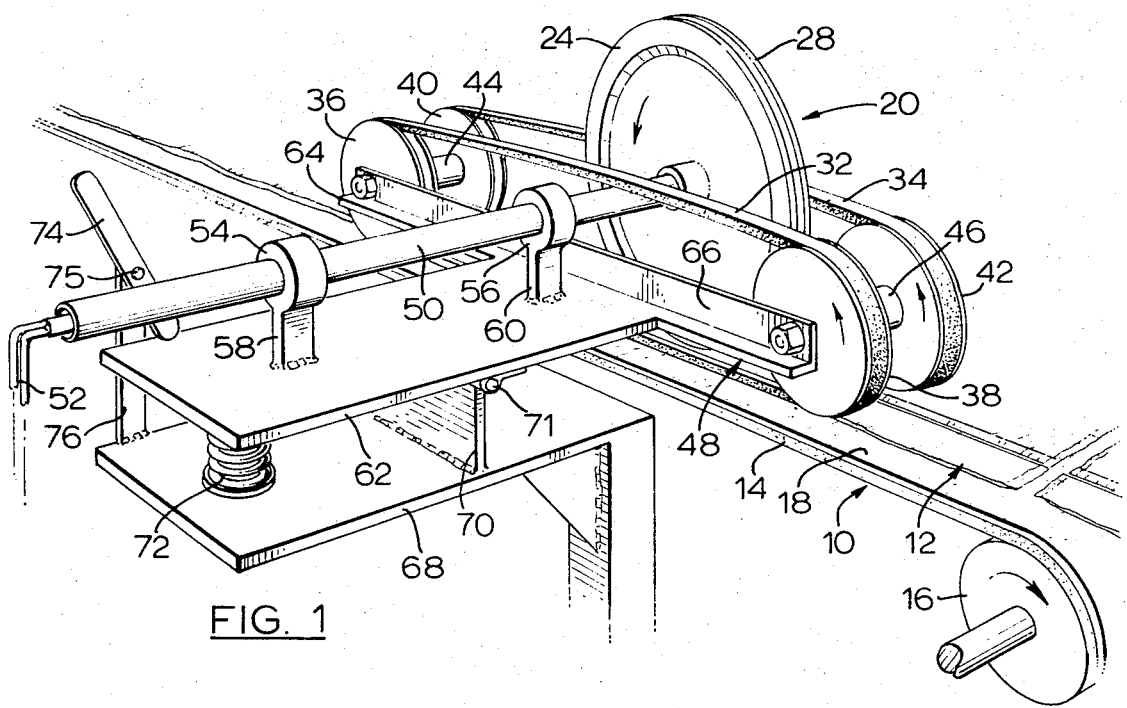
FIG. 1 is a perspective view of apparatus constructed according to the invention with parts cut away to more clearly illustrate its features.

A conveyor 10 supports a succession of filled plastic bags one of which is denoted by the numeral 12, and which have been previously end sealed. The conveyor 10 is of conventional construction having a belt 14 with a driven roller 16. The belt 14 has superimposed thereon a further belt 18 which is made of a resilient material such as asbestos fibre; the belts 14 and 18 move in unison.

A rotary heat sealing member generally denoted by the numeral 20 is located above and disposed normally to the asbestos belt 18. The rotary member 20 is of special construction and it comprises a first heat sealing and cutting roller member 24 which is provided with internally positioned heating elements 23. The periphery 26 of the roller 24 is contoured to define a ridge. See FIG. 2.

The rotary member 20 has a second heat sealing roller member 28 which is heated indirectly by conduction from the heated sealing and cutting roller member 24. The sealing member 28 therefore operates at a lower temperature than the heat sealing and cutting member 24 and because of this fact, the member 28 does not effect a cut. Furthermore, the diameter of the member 28 is somewhat less than that of the member 24 and its periphery 30 does not exert the same pressure on the films as the perimeter 26 of the heat sealing and cutting member 24.

Figure 2:
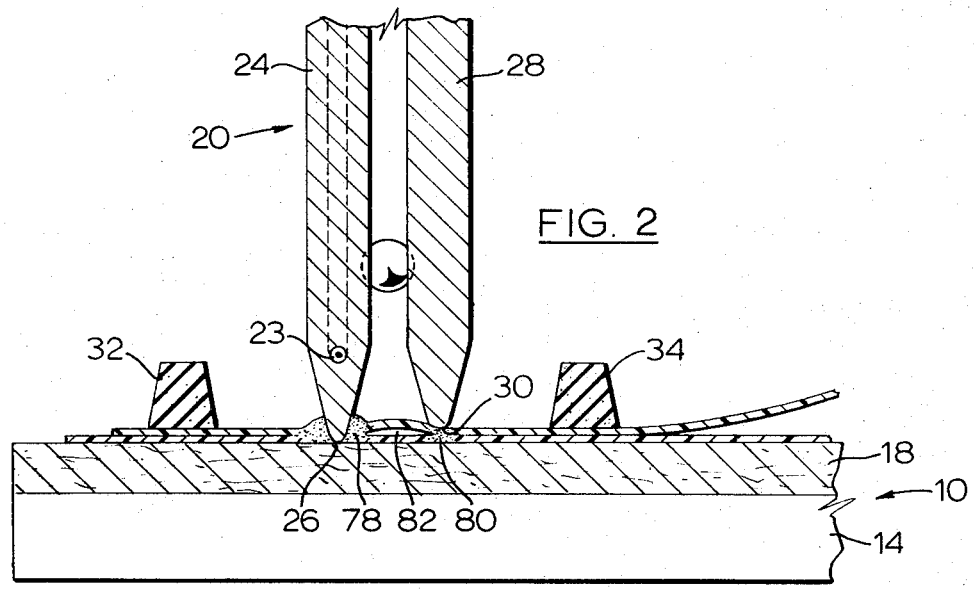
FIG. 2 is a diagramatic illustration of the edge seal formed by the apparatus shown in FIG. 1.

As a result of the construction of this rotary member 20, the seal is formed in two parts, this being illustrated diagramatically in FIG. 2. The heat sealing and cutting member 24 forms what is known as a bead seal indicated at 78 due to a combination of it working at a higher temperature and exerting greater pressure than the member 28. In practice, the sealing and cutting action of the member 24 causes melting of the film and forces the material upwards along the peripheries 26 and 30 as illustrated in FIG. 2. The other sealing member 28 forms what is known as a fin seal 80 and, as illustrated, there is actually an air gap 82 between the bead and the fin seal as a result of the action of the rotary member 20.

It has been found that this dual seal gives much greater strength to the package during subsequent use. The yieldable nature of the belt 18 provides a somewhat broad contact area for the heat sealing and cutting member 24 and a relatively wide fused area is provided. Also, the fact that the material of the belt 18 is made of asbestos prevents burning of the conveyor belt 16.

Because the members 24 and 28 operate at different temperatures, tension is exerted on the films during sealing and immediately afterwards; to prevent distortion it is necessary to provide support during and after the sealing process. This is provided by a pair of belts 32 and 34. The belt 32 is carried on a pair of spaced apart pulleys 36 and 38 placed fore and aft of the rotary member 20, and the belt 34 is similarly carried on a pair of corresponding pulleys 40 and 42. The pulleys 36 and 40 are carried on an axle 44 and the pulleys 38 and 42 are carried on an axle 46.

The rotary member 20 and the belts 32 and 34 with their associated pulleys 36 and 38, 40 and 42 have a fixed relation which is provided by a support frame generally denoted by the numeral 48. This comprises a hollow axle 50, one end of which is secured to the middle of the rotary member 20, the axle 50 carrying electric leads 52 connected to the heating element 24. The axle 50 is located in a pair of bearings 54 and 56 each of which has a downwardly extending abutment 58 and 60 respectively, secured to a plate 62. Arms 64 and 66 are bolted to the plate 62 and the arms 64 and 66 are secured respectively to the axles 44 and 46 which carry the pulleys 36, 40 and 38, 42. Below the plate 62 is a horizontally disposed stationary plate 68 which has an upwardly extending bracket 70 secured to its mid portion. The upper part of bracket 70 is hinged as at 71 to the underside of upper plate 62.

A coil spring 72 is positioned between the plates 62 and 68 outward of the bracket 70 with respect to the roller member 20. It will be appreciated that the action of the spring 72 causes the plate 62 to pivot on the hinge 71, thus resiliently bearing the roller member 20 and the belts 32 and 34 against the asbestos belt 18. A lever arm 74 operates to raise roller member 20 and belts 32 and 34 away from the belt 18, the lever arm 74 being pivoted at 75 to the upper end of an arm 76 which is secured to the lower plate 68 outward of the spring 72 with respect to the rotary member 20. When the arm 74 is pivoted to the vertical position, its lower end which extends beyond the pivot point bears against the upper surface of the plate 62 causing it to pivot on the hinge 71.

The embodiments of the invention in which an exclusive property or privilege is claimed are defined as follows:

1. Apparatus for the side sealing of two layers of heat sealable film to complete a package, said apparatus including a rotary sealing and cutting member formed of a first, circular, heated sealing and cutting disc and a second circular heat sealing disc located to the side of the first mentioned disc nearer said package and having a diameter less than that of said first mentioned disc, said second disc being heated by heat transfer from said first disc; a pair of upper belts located one to each side of said rotary sealing and cutting member and each supported by a pair of pulleys, one at each end of each belt; a third, driven, belt of resilient material situated beneath said rotary sealing and cutting member and said pair of upper belts; and resilient means cooperative with said rotary sealing and cutting member to press said sealing and cutting member and said pair of upper belts against said third belt.

2. Apparatus according to claim 1 wherein said third belt is made of asbestos fibre.

3. Apparatus according to claim 1 wherein said rotary sealing and cutting member and said pair of upper belts are supported from plate means, and where pivotable means are associated with said plate means, and including means to cause pivoting action of said plate means against the force of said resilient means to raise said rotary sealing and cutting member and said pair of upper belts away from said third belt.

* * * * *